United States Patent [19]

Wellach

[11] Patent Number: 5,342,069
[45] Date of Patent: Aug. 30, 1994

[54] TOOL HOLDER FOR MACHINE TOOLS

[76] Inventor: Adolf Wellach, Kieskamper Weg 32, D-4411 Ahaus-Wessum, Fed. Rep. of Germany

[21] Appl. No.: 39,285
[22] PCT Filed: Aug. 19, 1992
[86] PCT No.: PCT/EP92/01893
§ 371 Date: Apr. 19, 1993
§ 102(e) Date: Apr. 19, 1993
[87] PCT Pub. No.: WO93/03875
PCT Pub. Date: Mar. 4, 1993

[30] Foreign Application Priority Data

Aug. 20, 1991 [DE] Fed. Rep. of Germany ....... 4127484

[51] Int. Cl.$^5$ ............................................. B23B 31/02
[52] U.S. Cl. ....................................... 279/16; 464/102
[58] Field of Search .................. 279/16; 464/102, 104, 464/105

[56] References Cited

U.S. PATENT DOCUMENTS

| | | | |
|---|---|---|---|
| 3,072,417 | 1/1963 | Ziegler | 279/16 |
| 3,454,283 | 7/1969 | Benjamin et al. | 279/16 |
| 5,013,054 | 5/1991 | Burnet | 279/16 |

FOREIGN PATENT DOCUMENTS

| | | |
|---|---|---|
| 1152307 | 8/1983 | Canada ............ 279/16 |
| 8308120 | 7/1983 | Fed. Rep. of Germany . |
| 8913215 | 12/1989 | Fed. Rep. of Germany . |

*Primary Examiner*—Steven C. Bishop
*Attorney, Agent, or Firm*—Blakely, Sokoloff, Taylor & Zafman

[57] ABSTRACT

The tool holder has a mounting portion (1,2) on the machine side and on the tool side and is provided with a coupling device (3) which rotationally fixedly connects the mounting portions together with a radial clearance. The coupling device includes a radially movable coupling disc (4) with two pairs of radial slots extending perpendicular to one another, axial carriers (7) on the mounting portion (1) on the machine side engaging in the one pair and axial carriers (8) on the mounting portion on the tool side engaging in the other pair. The coupling disc (4) bears on both sides on rollers which are arranged in roller cages (9) and are orientated in accordance with the perspective direction of movement.

17 Claims, 2 Drawing Sheets

TOOL HOLDER FOR MACHINE TOOLS

The invention relates to a tool holder for machine tools with a mounting portion on the machine side and on the tool side and with a coupling device which rotationally fixedly connects the mounting portions together with a radial clearance and which is supported on both sides in the axial direction via rolling bodies and has a radially movable coupling disc with at least two radial slots extending perpendicularly to one another, an axial carrier on the one mounting portion engaging in the one slot and an axial carrier on the other mounting portion engaging in the other slot.

Such tool holders are always used where existing bores must be machined with high precision. For instance, they are used to receive thread cutting tools and, first and foremost, reamers. The coupling device, which is also known under the name Oldham coupling, compensates for any axial offset between the tool and the bore to be machined using the radial clearance ensured by the coupling device between the mounting portion secured to the machine tool and the mounting portion accommodating the tool. The rolling bodies serve to make these radial movements easy to perform. In the case in which the tool is stationary and the workpiece rotates there is only a single adjusting movement per bore. In the reverse case every rotation of the tool causes a cyclical adjustment movement.

In a known tool holder of the type referred to above (DE-B 1256039) the rolling bodies are constructed as balls. Balls have excellent running characteristics. However, they are associated with the disadvantage that the axial forces which occur must be transmitted by point contact. These axial forces are considerable, caused by the high feed speeds with which modern machine tools operate. Under these loads the balls damage the associated opposing surfaces but over very small regions since the radial movements are small. The ease of movement of the coupling thus decreases. In extreme cases complete jamming occurs.

In order to prevent this a further known tool holder (DE-C 3425869) uses a coupling disc whose axial surfaces are constructed as sliding surfaces. This coupling operates practically without wear, its ease of movement for the machining of steel and other metals of comparable hardness being easily sufficient. It has, however, been found that difficulties can arise when machining metals of lesser hardness, for instance with light metals such as aluminium and alloys thereof. If, in this case, the radial adjustment movement is delayed even slightly, inaccuracies occur, at least in the entry region of the bore. Such inaccuracies can not be tolerated in, for instance, aerospace technology, for instance when reaming rivet holes.

It is thus the object of the invention to provide an apparatus of the type referred to above which operates substantially without wear and possesses a high degree of ease of movement for long periods of operation.

In order to solve this object the tool holder in accordance with the invention is characterised in that the rolling bodies are constructed as rollers.

It has been found that changing over from the point contact of balls to the line contact of rollers is sufficient to transmit even extreme axial forces without damaging the flat running surfaces, even for long periods of use.

Surprisingly, it has been found that this is substantially independent of the orientation of the rollers. Even if the rollers perform sliding movements the running surfaces remain undamaged. Of principal importance is that the ease of movement of the radial compensation is only insubstantially impaired.

It is thus possible in a further embodiment of the invention to arrange the rollers in recesses in the coupling disc whereby sliding movements of the rollers necessarily occur in certain directions of movement.

The rollers are preferably aligned parallel to one another.

In an alternative, which is also preferred, the rollers are aligned parallel to one another in sets. For this purpose the axes of the rollers can be orientated in the peripheral direction or in the radial direction. The alignment of the roller axes with respect to the direction of the two radial slots in the coupling disc is in any event of secondary significance.

In an important further embodiment of the invention, which differs from the arrangement of the rollers in the recesses in the coupling disc, the coupling disc bears on the rollers on both sides with axial surfaces and the rollers on each side are aligned parallel to one another, their axes extending perpendicular to the direction of movement of the coupling disc with respect to the carrier on the associated mounting portion. Under these circumstances, all possible movements occur in the running direction of the rollers in question. This applies not only with respect to those movements which the coupling disc performs relative to one of the mounting portions but also with respect to those movements which the other mounting portion performs relative to the coupling disc. A separate set of rollers with appropriately orientated axes is provided for each of these movements.

It is particularly advantageous to arrange the rollers on each side in a cage which has at least one axial slot through which the carrier on the associated mounting portion may pass and is provided with recesses for the rollers which are aligned parallel to one another and perpendicularly to the radial slot. The rollers are reliably guided, whereby the cages are free to perform independent movements in that direction in which the movement between the coupling disc and the associated mounting portion also occurs.

It is further proposed in a further embodiment of the invention that each cage has four radial slots offset from one another by 90°, distributed between which are four recesses for the rollers which are aligned perpendicular to one of the pairs of slots. Under these circumstances the two cages can be used for the transfer of torque. The function of the coupling disc may be reduced to that of a support disc between the two sets of rollers. Furthermore, a construction is produced which is favourable as regards its weight.

The latter applies particularly if, as is proposed by the invention, the cages are constructed as annular discs.

This feature will incidentally be used if, for instance in the case of a reamer holder, coolant is fed centrally through the tool holder.

The cages for the two sets of rollers can have the same shape and differ only in their installation position.

The one mounting portion is advantageously elastically biased towards the other mounting portion, the spring force being transmitted with the interposition of a ball bearing. The elastic biasing ensures that the rollers can not tilt in the unloaded state, the ball bearing ensuring that the application of the spring force does not impede the compensation movements.

Those combinations of the features in accordance with the invention which differ from the combinations discussed above are also disclosed as being of importance to the invention.

The invention will be described below in more detail with reference to preferred exemplary embodiments in conjunction with the accompanying drawings, in which.

Figure 1:
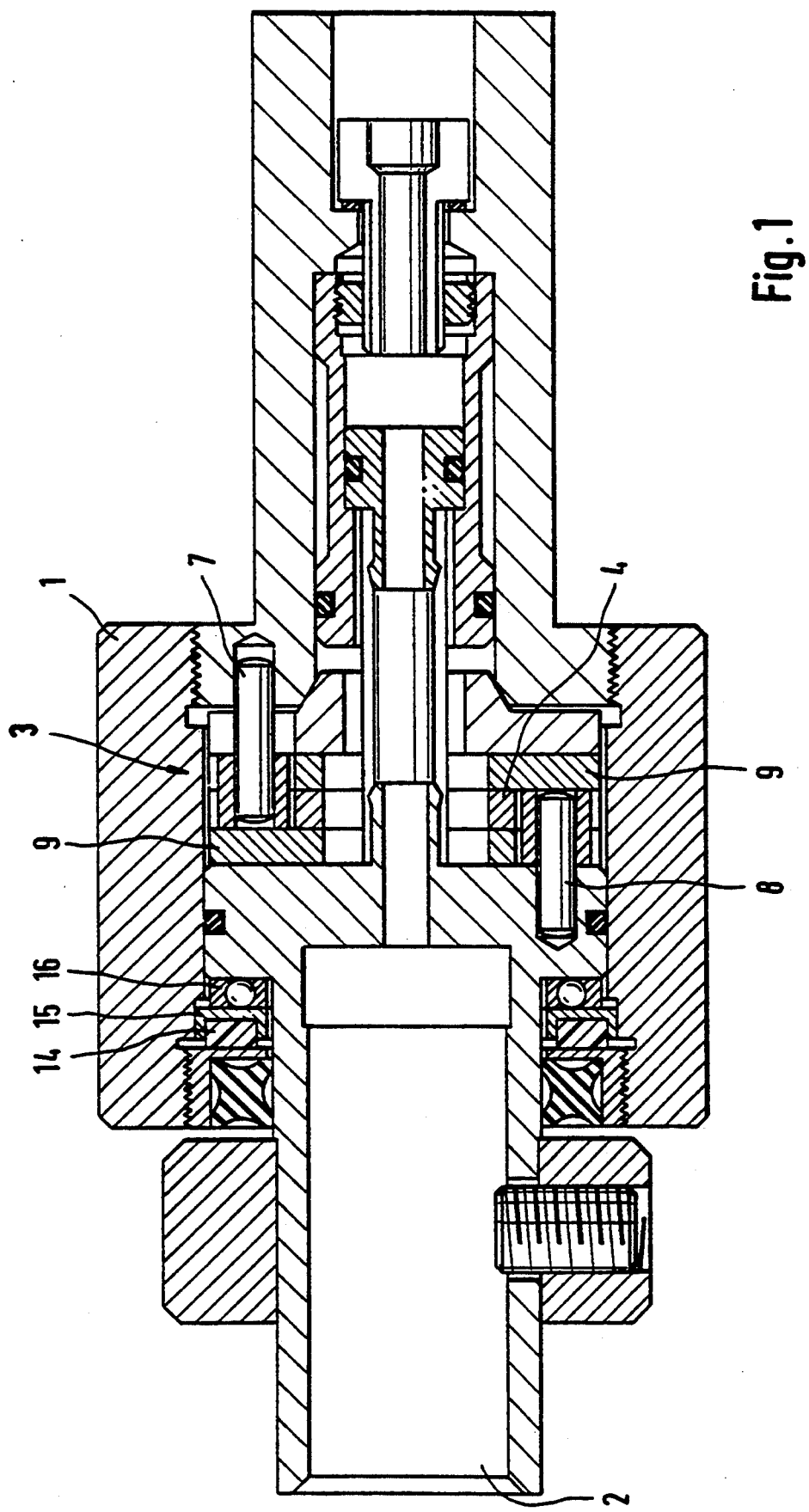
FIG. 1 is an axial sectional view through a tool holder in accordance with the invention.

The tool holder of FIG. 1 has a mounting portion 1 on the machine side which can be pushed into the drive of the machine. The mounting portion 1 is connected to a mounting portion 2 on the tool side which serves to receive the tool, in the present case a reamer. In order to compensate for any possible axial offset between the tool and the bore to be reamed, the mounting portion 2 can perform small radial movements relative to the mounting portion 1. These radial movements are permitted by a coupling device 3 which simultaneously serves to transmit the axial forces from the mounting portion 1 to the mounting portion 2.

Figure 2:
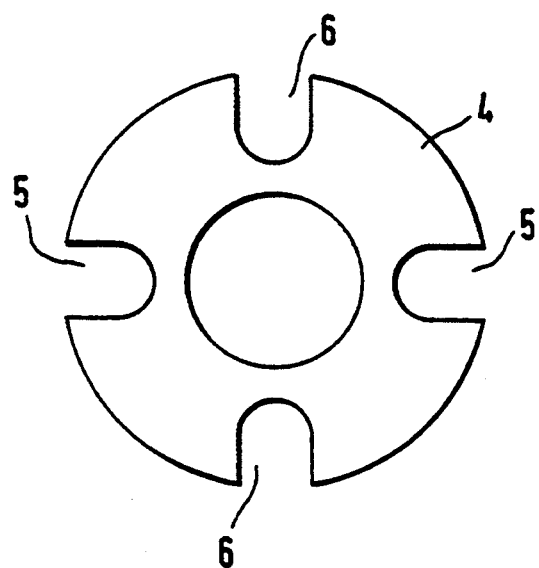
FIG. 2 shows the coupling device used in the apparatus of FIG. 1.

The coupling device 3 includes principally a coupling disc 4, whose shape may be best seen in FIG. 2. The coupling disc has two pairs of radial slots 5 and 6 which are offset from one another by 90°. Engaging in the slots 5 is a pair of pegs 7 on the mounting portion 1 on the machine side whilst the slots 6 are in engagement with a pair of pegs 8 on the mounting portion on the tool side. In this respect the representation of the carriers 7 and 8 in FIG. 1 is offset through 90°.

Figure 3:
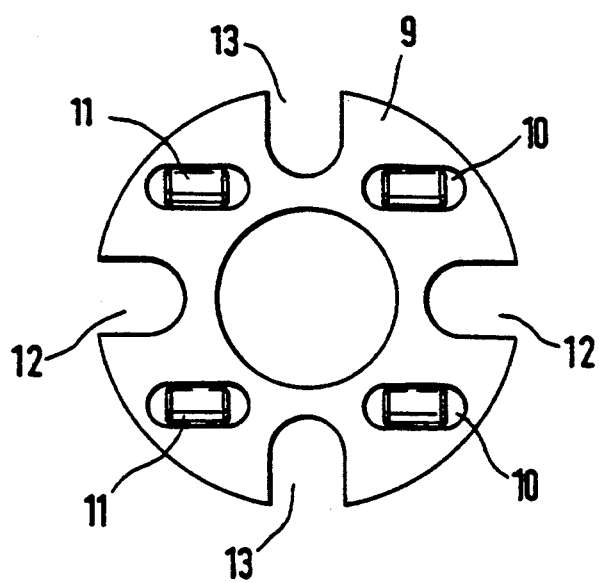
FIG. 3 shows one of the cages used in the apparatus of FIG. 1.

Provided on both sides of the coupling disc 4 are cages 9 of which one is shown in FIG. 3. It has four recesses 10 for guiding rollers 11. Furthermore, two pairs of slots 12 and 13 are provided offset from one another by 90°. The rollers 11 are aligned parallel to one another, their axes extending perpendicularly to the radial slots 13. In the event of radial movements in the direction of the slots the rolling effect of the rollers 11 becomes effective.

The two cages 9 are of identical construction but mounted offset by 90°. All the movements of the coupling device 13 are performed also by the rollers 11. This results in extremely easily movable adjustment with the simultaneous transmission of high axial forces. Even in long term operation no damage of the running surfaces occurs on the coupling disc 4 or the associated mounting portions.

The radial slots 12 in the cages 9 are provided for the purpose of weight reduction. In a modified embodiment they can also be engaged by the opposing pair of carriers, whereby the cages are then used for the transmission of torque.

In order to ensure that the rollers are under a slight biasing force even in the unloaded state and accordingly cannot tilt, spring elements 14—of plastics material in the present case—are provided which bear on the mounting portion 1 on the machine side and urge the mounting portion 2 on the tool side against the mounting portion 1. The spring force is transmitted with the interposition of a ring 1 and a ballbearing 16. The ballbearing 16 ensures that the compensation movements are not impeded by the biasing.

In order to cool the reamer the tool holder is provided with a central coolant supply. Accordingly, the cages 9, and also the coupling disc 4, are constructed as annular discs.

Figure 4:
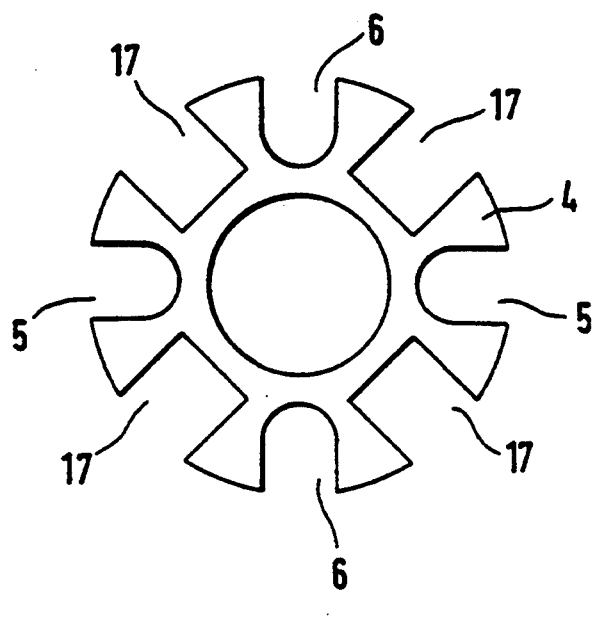
FIG. 4 shows a coupling disc for a modified embodiment.

FIG. 4 shows a coupling disc 4 for a modified embodiment. This coupling disc is also provided with pairs of radial slots 5 and 6 for the engagement of the pairs of carriers 7 and 8. Furthermore, radial recesses 17, which accommodate rollers, which are not illustrated, are machined into the coupling disc 4. The coupling disc thus acts in this case as a cage for the rollers which act directly between the engagement surfaces of the two mounting portions 1 and 2. This construction is also characterised by a long service life. The rollers perform combined rolling and compensating movements but the ease of movement is only insignificantly reduced thereby. Above all, it remains substantially constant over time.

All the rollers can be aligned with their axes parallel to one another. There is also the possibility of aligning them parallel in sets. All the roller axes can be orientated radially. They can however also each extend in the peripheral direction.

Furthermore, the invention may also be used in conjunction with tool holders which are able to compensate for an angular offset between the tool and the bore to be machined in addition to the axial offset.

Modifications are of course possible within the scope of the invention. Thus each mounting portion can operate with a single carrier, whereby two radial slots are sufficient for the coupling disc whilst a single radial slot is sufficient for the cages. Depending on the space conditions there can also be six rollers. In the coupling disc of FIG. 4 there is the possibility of orientating the rollers as is shown in FIG. 3. Then only rolling movement occurs in one defined direction and only sliding movement in the other defined direction.

I claim:

1. Tool holder for a tool of a machine too, said tool holder comprising:
    a mounting portion associated with the machine tool and a mounting portion associated with the tool which define an axial direction, and
    a coupling device which rotationally fixedly connects the mounting portions together with a radial clearance and which is supported via rolling bodies in the form of rollers in the axial direction both towards the machine tool and also towards the tool and has a coupling disc, which is movable radially to the axial direction, with at least two slots extending perpendicularly to one another and radially to the axial direction, a carrier directed in the axial direction on the one mounting portion engaging in the one slot and a carrier directed in the axial direction on the other mounting portion engaging in the other slot.

2. Tool holder as claimed in claim 1, wherein the rollers are arranged in recesses in the coupling disc.

3. Tool holder as claimed in claim 2, wherein the rollers are aligned parallel to one another.

4. Tool holder as claimed in claim 2, wherein the rollers are aligned parallel to one another in sets.

5. Tool holder as claimed in claim 1, wherein the coupling disc bears on the rollers towards the machine tool and towards the tool with a respective surface directed in the axial direction and that the rollers on each side are aligned parallel to one another, the rollers defining axes which extend perpendicular to that slot in which the carrier on the associated mounting portion engages.

6. Tool holder as claimed in claim 5, wherein the rollers on each side are arranged in a cage which has at least one slot extending radially to the axial direction through which the carrier on the associated mounting portion passes and is provided with recesses for the rollers which are aligned parallel to one another and perpendicularly to the radial slot in the associated cage.

7. Tool holder as claimed in claim 6, wherein each cage has four slots which are offset from one another by 90° and extend radially to the axial direction and which define two pairs of slots parallel to one another and that distributed between the slots there are four recesses for the rollers which are aligned perpendicularly to one of the pairs of the parallel slots.

8. Tool holder as claimed in claim 6 or 7 wherein the cages are constructed as annular discs.

9. Tool holder as claimed in claim 1 or 2 wherein the one mounting portion is biased towards the other portion by an elastic force and that the elastic force is transmitted by a ball bearing.

10. Tool holder as claimed in claim 5 or 6 wherein the one mounting portion is biased towards the other portion by an elastic force and that the elastic force is transmitted by a ball bearing.

11. Tool holder for a tool of a machine tool, said tool holder comprising:
   a mounting portion associated with the machine tool and a mounting portion associated with the tool which define an axial direction, and
   a coupling device which rotationally fixedly connects the mounting portions together with a radial clearance and which is supported via rolling bodies in the form of rollers in the axial direction both towards the machine tool and also towards the tool and has a coupling disc, which is movable radially to the axial direction, with at least two slots extending perpendicularly to one another and radially to the axial direction, a carrier directed in the axial direction on the one mounting portion engaging in the one slot and a carrier directed in the axial direction on the other mounting portion engaging in the other slot, wherein the rollers are arranged in recesses in the coupling disc, and every roller is aligned parallel to at least one roller.

12. Tool holder as claimed in claim 11, wherein the rollers are aligned parallel to one another.

13. Tool holder as claimed in claim 11 or 12, wherein the one mounting portion is biased towards the other portion by an elastic force and that the elastic force is transmitted by a ball bearing.

14. Tool holder for a tool of a machine tool, said tool holder comprising:
   a mounting portion associated with tile machine tool and a mounting portion associated with the tool which define an axial direction, and
   a coupling device which rotationally fixedly connects the mounting portions together with a radial clearance and which is supported via rolling bodies in the form of rollers in the axial direction both towards the machine tool and also towards the tool and has a coupling disc, which is movable radially to the axial direction, with at least two slots extending perpendicularly to one another and radially to the axial direction, a carrier directed in the axial direction on the one mounting port engaging in the one slot and a carrier directed in the axial direction on the other mounting portion engaging in the other slot, wherein the coupling disc bears on the rollers towards the machine tool and towards the tool with a respective surface directed in the axial direction and that the rollers on each side are aligned parallel to one another, the rollers defining axes which extend perpendicular to that slot in which the carrier on the associated mounting portion engages, and wherein the rollers on each side are arranged in a cage which has at least one slot extending radially to the axial direction through which the carrier on the associated mounting portion passes and is provided with recesses for the rollers which are aligned parallel to one another and perpendicularly to the radial slot in the associated cage.

15. Tool holder as claimed in claim 4, wherein each cage has four slots which are offset from one another by 90° and extend radially to the axial direction and which define two pairs of slots parallel to one another and that distributed between the slots there are four recesses for the rollers which are aligned perpendicularly to one of tile pairs of the parallel slots.

16. Tool holder as claimed in claim 14 or 15, wherein the cages are constructed as annular discs.

17. Tool holder as claimed in claim 14 wherein the one mounting portion is biased towards the other portion by an elastic force and that the elastic force is transmitted by a ball bearing.

* * * * *